May 23, 1939.　　　G. F. MAGLOTT　　　2,159,744

GEAR PUMP

Filed Aug. 26, 1936

INVENTOR.
George F. Maglott
BY Barlow & Barlow
ATTORNEYS.

Patented May 23, 1939

2,159,744

UNITED STATES PATENT OFFICE 2,159,744

GEAR PUMP

George F. Maglott, Wrentham, Mass., assignor to Brown & Sharpe Manufacturing Company, a corporation of Rhode Island Application August 26, 1936, Serial No. 97,970

6 Claims. (Cl. 103—128)

This invention relates to a gear pump; and has for one of its objects the improved efficiency of the pump by eliminating trapping of the pumped liquid and thereby reducing bearing load and preventing wear, chattering and noise of the gears during their pumping action, by an arrangement whereby the intermeshing teeth as they contact on one side of the tooth eliminate the pocket formed across the space between the teeth and yet the shape of a tooth is such that a driving action will be had from one gear to the other.

Another object of the invention is to provide a driving action of the gears of a gear pump one to the other and at the same time provide a non-trapping form of tooth having a maximum displacement by adding a smooth, rounding contour on the tip of involute teeth, the curve being generated or derived from a circular arc and providing an improved seal between pressure and intake sides of the gear pump.

Another object of this invention is to secure uniform flow of fluid such as may be had with helical teeth and at the same time providing the minimum helical advance thus reducing the "helical" leakage or slip through the gears to a minimum.

Another and more specific object of this invention is the advance of the helical teeth across the face of the gear, an amount equal to one-half the circular pitch of the teeth, this advance occurring regularly and yet providing an advance less than that which has heretofore been considered necessary in all formations of pumps of this type which have heretofore come to my attention.

With these and other objects in view, the invention consists of certain novel features of construction, as will be more fully described, and particularly pointed out in the appended claims.

In the use of gear pumps having the usual involute teeth liquid is trapped between the teeth in a sealed pocket formed between the crest of the teeth on one rotor member and the roots of the teeth on the cooperating rotor member, whereby a back pressure and chattering or vibration is caused due to the tremendous pressure exerted on the gears, and where the spiral or helical gear is provided an endwise motion also sometimes results. The back pressure is somewhat relieved in Patent No. 1,976,227 with which I am familiar, but in the present invention the back pressure or trapping instead of being relieved is entirely eliminated as no sealed pockets are formed due to a specific low continuity of the tooth profiles, whereby I prevent the trapping of the liquid in these spaces between teeth as one tooth contacts with the next tooth, because the opposite side of this tooth opens up a space whereby the liquid is discharged ahead of the point of contact, by an action similar to rolling. It has been discovered and can be demonstrated mathematically that with a form of conjugate tooth profile, particularly involute, trapping does not occur when the continuity is anything less than one-half and conversely trapping does occur in proportion after continuity exceeds one-half. Continuity may be defined as the property in involute or conjugate tooth profiles whereby the driving tooth transmits power smoothly to the driven tooth, for instance, a continuity of 1.0 is that condition whereby the approaching teeth of the gears just forms contact at the instant the receding teeth of the pair break contact.

Figure 1:
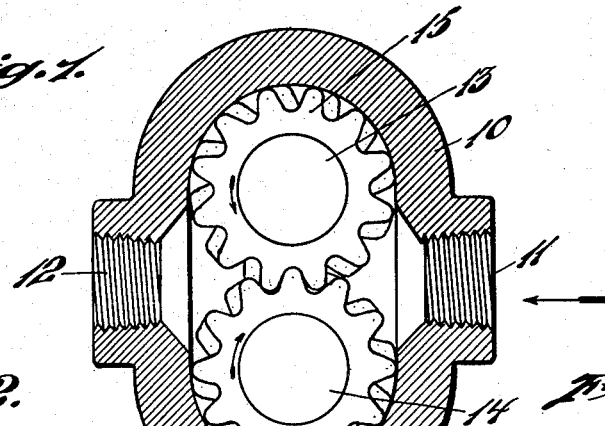
Fig. 1 is a sectional view through a gear pump.

However, with a continuity of only one-half, with regard to spur gear, a continuous driving action is not realized. In spur gears a continuity of not less than one is necessary for a continuous driving action. Further, it is known that where the spur type of gears are provided, although a pumping action occurs, relatively free from leakage through the gears, it gives an intermittent or pulsating displacement; and in order that the displacement may be continuous the teeth may be formed helically. However, if the helical advance of the teeth is too great an unrestricted flow occurs back through the gears which is undesirable; and I have found, that by using helical gears, provided with a helical advance equal to one-half the circular pitch and a continuity of one-half a continuous pumping action results, and a uniform displacement of fluid is realized, but no trapping is formed because the continuity of the teeth does not exceed one-half; and the following is a more detailed description of the present embodiment of this invention by which these advantageous results may be accomplished:

With reference to the drawing, 10 designates the body or casing of a usual type of gear pump having an inlet opening 11 and a discharge opening 12, although the character of the rotor members which I employ enable these inlet and discharge openings to be reversed; that is, the inlet openings may be 12 and the discharge opening 11. A pair of shafts 13 and 14 are rotatably mounted in bearings in the casing and gears 15 and 15' of identical construction are mounted on these shafts in an intermeshing relation, such as shown in Fig. 1, and are of a character such that one may drive the other. Inasmuch as these gears are of identical formation, either shaft can be a driving shaft and the gear mounted thereon be a driving gear, while the gear intermeshing with it becomes the driven gear.

Figure 5:
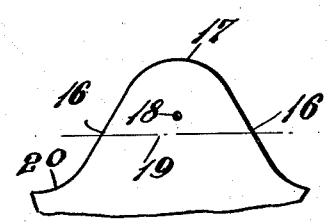
Fig. 5 is an enlarged somewhat diagrammatic view illustrating the shape of one of the gear teeth.
Figure 6:
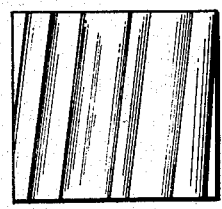
Fig. 6 is a top plan view of one of the gears.

The shape of all of the teeth on a section perpendicular to the axis is the same and is shown in an enlarged form in Fig. 5. In order that the teeth of the driving gear may transmit driving movement to the teeth of the driven gear with which it intermeshes, a portion of the surface of this tooth is of involute form. The involute section or portion of both the leading and trailing surfaces of the tooth is designated 16 in Fig. 5, and these involute surfaces on the opposite sides of each tooth are joined by the arc 17 of a circle which has a center 18 above the pitch line 19 of the tooth. The involute surfaces 16 between adjacent teeth are joined by the arc of a circle 20 which has its center below the pitch line 19. By reason of this formation, the teeth of one gear will drive the teeth of the other gear and by reason of the fact that each gear is of identical formation, it is immaterial which gear is the driving gear and which gear the driven gear. Also, as the teeth are perfectly symmetrical with respect to a central radial line through the tooth, it is immaterial in which direction the gears are driven.

Figure 2:
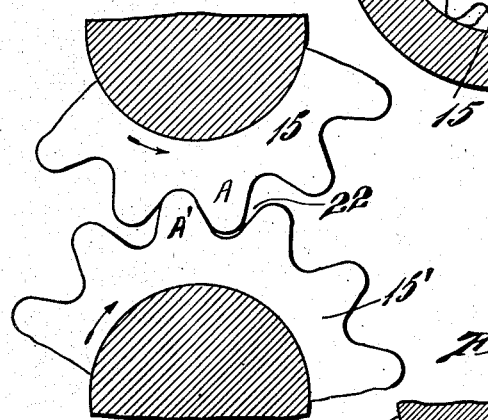
Fig. 2 is a fragmental sectional view showing the intermeshing relation of the gear teeth in one position.
Figure 3:
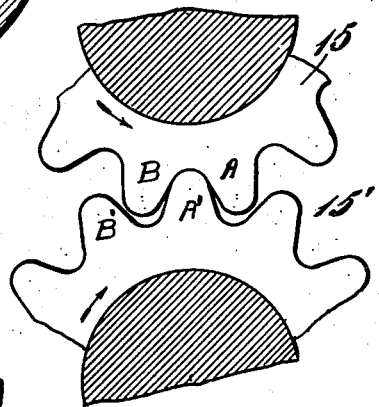
Fig. 3 is a view similar to Fig. 2 showing the gear teeth in a different relative position.
Figure 4:
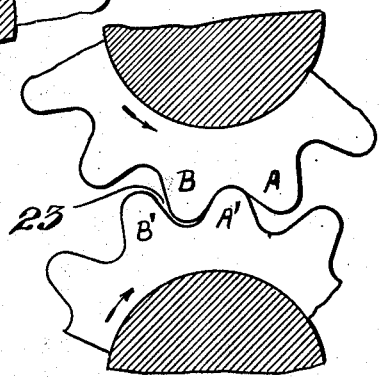
Fig. 4 is a similar view showing the gear teeth in a still different relative position.
Figure 7:
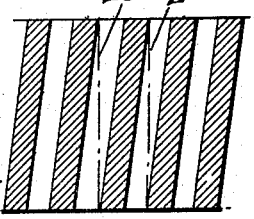
Fig. 7 is a diagrammatic sectional development of the gear teeth along the pitch line thereof.

This particular formation of teeth provides a continuity of only one-half and thus there will be no trapping of liquid as the gears rotate and intermesh one with the other. The relationship of the teeth in a profile at right angles to the axis is as shown in one position in Fig. 2, in which the tooth A' of gear 15' is driving the tooth A of gear 15, there being a freedom of flow of the liquid from the space 22 as the intermeshing of the teeth takes place. The gears in further advanced position are shown in Fig. 3, in which the tooth A' is between the teeth A and B of the gear 15, and these gears in a similar but more advanced relation are shown in Fig. 4. At no times does the space designated in Fig. 4 as 23 completely close and therefore there is no sealed pockets of the liquid formed to trap the liquid in a space between the teeth; and due to curved ends and roots of the teeth each tooth has its maximum displacement, the slightly greater radius at the base of the teeth with reference to the tip providing a practical arrangement for manufacturing purposes to prevent binding and noise. Where the continuity is one-half or less while no trapping occurs, if the spur type gear were so formed, there would be an intermittent transmission of drive from one gear to the other as the continuity must be 1.0 for continuous or uniform transmission of power; and to avoid this undesirable result I have formed the teeth helically with an advance across the face of the gear equal to one-half the circular pitch so that a continuous driving action of one gear to the other or a continuous pumping action results. Further, by this arrangement in contrast to the gear pump where the teeth extend across the face of the gear parallel to the axis of the gear and provide a free from leakage but pulsating pumping action, the helical advance of the teeth serve to reduce this pulsating action, although some leakage may occur. If the helical advance of the teeth is made too great leakage of the liquid through the gears is permitted, which is undesirable. It is, therefore, desirable to have the helical advance as short as possible and yet afford an even pumping action. In gear pumps of this helical type of gear it has always heretofore been accepted that this advance should be equal to the pitch of the teeth; that is, the distance between the centers of the teeth. I have found, however, that a still lesser advance than the pitch of the teeth can be had and that an advance of one-half the pitch may be used; and accordingly, I have shown in Fig. 7 somewhat diagrammatically a development along the pitch line of the gear. The advance is shown as one-half the pitch, the pitch being designated by dotted lines 25, 26 with advance of the tooth across the face of the gear in the direction of the axis equal to one-half of this amount.

Figure 8:
Fig. 8 is a diagrammatic view showing a relation of pressures developed in the gears.

By reason of the continuity of the teeth being one-half, the variations of pressure due to displacement of the liquid by one tooth entering between two other teeth will follow a curve such as represented at X in Fig. 8, in which the maximum and minimum lobes of the curve are one the complement of the other, while at the same time where the teeth of the gears are given a helical advance in the amount stated of one-half the pitch the variations in pressure due to this advance will follow a similar curve such as represented at Y in Fig. 8, and these curves will be related one to the other so that a uniform pressure results if these curves are added one to the other at any point of time in the relative positions of the gears.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a gear pump, intermeshing helical toothed gears, the respective helical teeth of the gears having an angle of advance on the face of the gears equal to one-half the circular pitch of the teeth and a continuity to provide a continuous driving action between the engaging teeth, the profile of each tooth being involute along a portion of the leading and trailing faces and extending at both sides of the pitch line with arcs of a circle joining said involute portions at their tips, and the involute portions of adjacent teeth at their base being joined by a circular arc, each tooth being so formed that during intermeshing of the teeth a slight clearance is maintained completely open at all times on both sides of the driven tooth between the adjacent cooperating driving teeth for freedom of fluid flow, the helical advance of said teeth serving to drive the fluid from the space between the intermeshing teeth ahead of the point of contact as the intermeshing of the teeth takes place.

2. In a gear pump, a toothed rotor having the profile of the teeth on a section perpendicular to the axis provided with a continuity equal to one-half, and a helical advance across the face of the rotor equal to one-half the circular pitch of the teeth.

3. In a gear pump, intermeshing helical gears one gear driving the other, the respective helical teeth of the gears having an angle of advance on the face of the gears equal to one-half the circular pitch of the teeth, the profile of the teeth on a section perpendicular to the axis shaped to prevent trapping and being involute along a portion of the leading and trailing faces with arcs of a single circle joining said involute portions.

4. In a gear pump, a toothed rotor having the profile of the teeth on a section perpendicular to the axis being shaped to prevent trapping and being substantially involute in form over portions of their extent, the involute portions being joined by curves generated or derived from a circular arc, said teeth being helical, and advancing on the face of the gear an amount equal to one-half the circular pitch of the teeth.

5. In a gear pump, a toothed rotor having the profile of the teeth on a section perpendicular to the axis being shaped to prevent trapping and being substantially involute in form over portions of their extent, the involute portions of each tooth at its tip being joined by curves generated or derived from a circular arc, and the involute portions of adjacent teeth at the base of the teeth being joined by curves generated or derived from a circular arc, said teeth being helical and advancing on the base of the gear an amount equal to one-half the circular pitch of the teeth.

6. In a gear pump, a toothed rotor having the profile of the teeth on a section perpendicular to the axis being shaped to prevent trapping and being involute in form over portions of their extent, the involute portions of each tooth at its tip being joined by the arc of a single circle and the involute portions of adjacent teeth at the base of the teeth being joined by the arc of a single circle, the arc at the tip of each tooth being of a radius smaller than the arc joining adjacent teeth at the base of the teeth, said teeth being helical and advancing on the base of the gear an amount equal to one-half the circular pitch of the teeth.

GEORGE F. MAGLOTT.